Figure 1A:
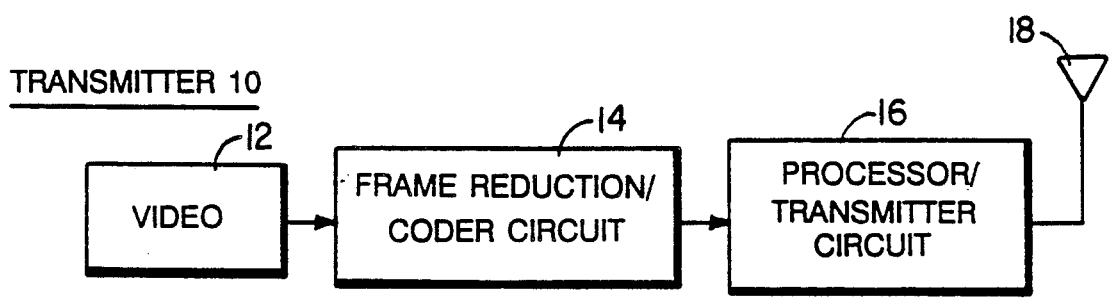

United States Patent [19]

Lim

[11] Patent Number: 5,072,296

[45] Date of Patent: Dec. 10, 1991

[54] VIDEO FRAME REDUCTION/RECONSTRUCTION METHOD AND APPARATUS

[75] Inventor: Jae S. Lim, Winchester, Mass.

[73] Assignee: Massachusetts Institute of Technology, Cambridge, Mass.

[21] Appl. No.: 484,929

[22] Filed: Feb. 23, 1990

[51] Int. Cl.$^5$ .................... H04N 7/01; H04N 7/04; H04N 7/08; H04N 11/06
[52] U.S. Cl. ................................. 358/140; 358/141; 358/142; 358/12
[58] Field of Search ............... 358/140, 141, 142, 146, 358/147, 11, 12

[56] References Cited

U.S. PATENT DOCUMENTS

| | | | |
|---|---|---|---|
| 3,715,483 | 2/1973 | Limb | 358/133 |
| 4,641,188 | 2/1987 | Diechert | 358/140 |
| 4,665,436 | 5/1987 | Osborne et al. | 358/136 |
| 4,866,509 | 9/1989 | Guida | 358/12 |
| 4,937,668 | 6/1990 | Hosaka | 338/146 |
| 4,947,249 | 8/1990 | Kondo | 358/135 |
| 4,953,023 | 8/1990 | Kondo | 358/135 |

OTHER PUBLICATIONS

"Picture Coding: A Review", Proceedings of the IEE, pp. 366–406 (Mar. 1980).
"Image Data Compression: A Review", Proceedings of IEE, p. 351 (Mar. 1981).
Two Dimensional Signal and Image Processing, (1990), Prentice Hall.

Primary Examiner—John K. Peng
Attorney, Agent, or Firm—Fish & Richardson

[57] ABSTRACT

A method and apparatus for reducing the amount of video information which is transmitted to a receiver, while still enabling the receiver to reconstruct a representation of the original video source material. In a preferred embodiment, a 60 frames per second progressively scanned video signal is transmitted at a 30 frames per second rate accompanied by decoding information. In short, every other frame is deleted and a respective nearest neighbor is selected to represent the deleted frame. This selection is represented by a digital selection information. Thus the transmitted frame information can be reconstructed into the original video source material after decoding with the digital selection information.

18 Claims, 4 Drawing Sheets

FIGURE 2A

EXAMPLE

TRANSMITTER

| VIDEO FRAME NUMBER | 1 | 2 | 3 | 4 | 5 | 6 | 7 | 8 | 9 | . . . . |
|---|---|---|---|---|---|---|---|---|---|---|
| TRANSMITTED FRAME | 1 | | 3 | | 5 | | 7 | | 9 | . . . . |
| TRANSMITTED NEIGHBOR INFORMATION | | | L (CLOSER TO LEFT) | | R (RIGHT) | | L (LEFT) | | L (LEFT) | |

FIGURE 2B

RECEIVER

| RECEIVED VIDEO FRAME | 1 | | 3 | | 5 | | 7 | | 9 | • | • | • | • |
|---|---|---|---|---|---|---|---|---|---|---|---|---|---|---|
| RECEIVED NEIGHBOR INFORMATION | | | L | | R | | L | | L | • | • | • | • |
| DISPLAYED VIDEO | 1 | 1 | 3 | 5 | 5 | 5 | 7 | 7 | 9 | • | • | • | • |

FIGURE 3A

EXAMPLE FOR FILM SOURCE

TRANSMITTER

| | | | | | | | | | |
|---|---|---|---|---|---|---|---|---|---|
| VIDEO FRAME NUMBER | 1 | 2 | 3 | 4 | 5 | 6 | 7 | 8 | 9 .. |
| CORRESPONDING FILM FRAME | F1 | F1 | F2 | F2 | F2 | F3 | F3 | F4 | F4 .. |
| TRANSMITTED FRAME | F1 | | F2 | | F2 | | F3 | | F4 .. |
| TRANSMITTED NEIGHBOR INFORMATION | | | L | | L | | R | | R ... |

FIGURE 3B

RECEIVER

| | | | | | | | | | |
|---|---|---|---|---|---|---|---|---|---|
| RECEIVED VIDEO FRAME | 1 | | 3 | | 5 | | 7 | | 9 .. |
| CORRESPONDING FILM FRAME | F1 | | F2 | | F2 | | F3 | | F4 .. |
| RECEIVED NEIGHBOR INFORMATION | | | L | | L | | R | | R .. |
| DISPLAYED VIDEO CORRESPONDING FILM FRAME | F1 | F1 | F2 | F2 | F2 | F3 | F3 | F4 | F4 .. |

VIDEO FRAME REDUCTION/RECONSTRUCTION METHOD AND APPARATUS

BACKGROUND OF THE INVENTION

The present invention relates to reduction of information in transmission signals for advanced video systems.

The video source material used in various proposed advanced television systems is video progressively scanned at a rate of 60 frames per second. Transmission of this video material therefore requires a large bandwidth so as to accommodate transmission of a substantial amount of video information.

SUMMARY OF THE INVENTION

The present invention provides method and apparatus for reducing the amount of video information which is transmitted to a receiver, while still enabling the receiver to reconstruct a representation of the original video source material. In a preferred embodiment, every other frame is deleted and a respective nearest neighbor is selected to represent the deleted frame. This selection is represented by digital selection information. Thus the undeleted frame information can be employed to represent the original video source material after decoding with the digital selection information.

More particularly, an aspect of the invention includes reducing the information required to represent a multiplicity of sequential frames of video source material having a frame rate of N frames per second, by selecting a subset of the multiplicity of frames, selecting a given frame not in the subset and for the given frame making a determination of which frames of the subset are its respective leading and trailing neighbors and which of these neighbors should be used to represent the given frame, and representing this determination with selection information, whereby a representation of a portion of the video source material may be generated with the selection information and the subset. This representing may include storing and/or transmitting over a communication channel the subset of frames and selection information. Preferably every other frame is in the subset so that the multiplicity of frames is processed at a rate of N/2 frames per second. Making a determination may include the step of determining the respective error differences between the frame not in the subset and its nearest neighbors in the subset and selecting the nearest neighbor in the subset which satisfies a preferred criterion. A nearest neighbor satisfying the preferred criterion preferably includes being the nearest neighbor having the lesser of the error differences. Preferably the preferred criterion is preferential selection of the nearest neighbor trailing or leading the given frame regardless of the relationship of the various error differences unless the error difference attributed to the preferentially selected nearest neighbor is greater by a preset percentage than the difference associated with the nonselected nearest neighbor. The respective error differences may be energy differences obtained by comparing respective regions of the compared frames.

A preferred embodiment of the invention includes reducing broadcast information by representing N frames per second of video source material with M frames per second of the video source material, where N>M, by capturing a segment of the video material having a first, middle and third consecutive frame, determining the content difference between the first and middle and the middle and third frames, selecting either the first or third frame to represent the middle frame and representing this selection with selection information, and maintaining as broadcast material the first and third video frame and the selection information, wherein maintaining may include transmitting the broadcast material over a communication channel or storing the broadcast material for later use, whereby a representation of the captured segment of the video material can be generated from the broadcast material. Preferably, M=N/2; and/or N=60 and M=30.

Other features and advantages will become apparent from the following detailed description when read in connection with the accompanying drawings in which:

FIG. 1(a), (b) is a block diagram of a transmitter and a receiver in practice of the present invention.

FIG. 2(a), (b) is a comparison of video frame number, transmitted frame number, transmitted neighbor information, at the transmitter, and received frame, received neighbor information and displayed video, at the receiver.

FIG. 3(a), (b) is a comparison such as in FIG. 2(a), (b), but as applied to corresponding film frames as source material.

Figure 4A:
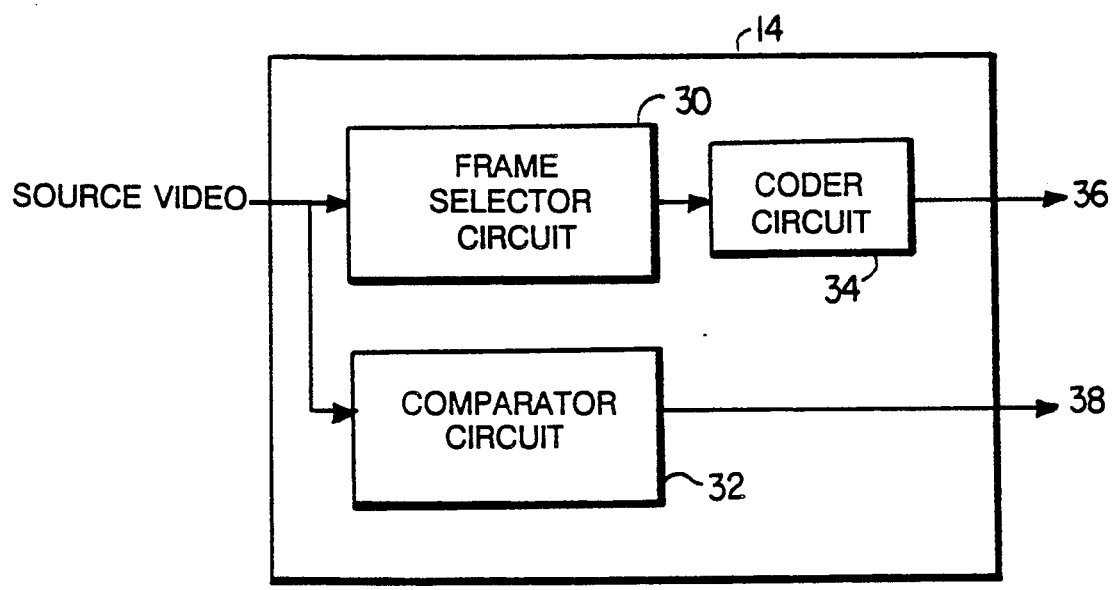

FIG. 4(a), (b) is a block diagram of a preferred embodiment of the present invention at the transmitter and then at the receiver.

As shown in FIG. 1(a), (b), transmitter 10 in practice of the present invention includes a video source 12, a frame reduction/coder unit 14, a signal processor/transmitter unit 16, and antenna 18. Receiver 20 includes antenna 22, receiver unit 24, decoder/frame reconstruction unit 26, and display 28.

In practice of the invention, progressively scanned video source material is supplied by video unit 12 to the frame reduction unit at a rate such as 60 frames per second. As shown in FIG. 2(a), in a preferred embodiment of the invention the video frame material at the transmitter is presented as a consecutive set of frames 1–9 . . . . The frame reduction/coder circuit 14 selects every odd frame 1, 3, 5, 7, 9 (or every even) as the frames to be transmitted from the video frame material and codes (represents efficiently) the frames to be transmitted. (In a preferred embodiment, such coding includes transform or subband coding.) This method reduces the frame rate to be transmitted from 60 frames per second to 30 frames per second, although other than a 2:1 reduction is also within the scope of the present invention.

In the preferred embodiment it is desired to be able to reconstruct the 60 frame per second video at the receiver. Therefore, a comparison is made at the transmitter of the deleted frame (for example, frame 2) with its neighbors (for example, frames 1 and 3). The comparison is performed to determine to which neighbor the deleted frame is closer in content. Based upon this comparison, the deleted frame will be considered to be closer to one of the neighboring frames (1 or 3). Now a digital indicator bit is transmitted indicating this determination. In a preferred embodiment the neighbors evaluated are nearest neighbors, such as the leading and trailing frames 1 and 3.

As shown in the example of FIG. 2(a), the deleted frame was determined to be closer in content to the first video frame and therefore the digital nearest neighbor information indicates L (for closer to the left frame). The next deleted frame, frame 4, is shown in this example to have content closer to frame 5 on the right, and therefore the digital neighbor information indicates R (for closer to the right frame). Frames 6 and 8 are shown indicated to be closer to their left nearest neighbor, respectively. Now the transmitter 16 transmits both the video information of frames 1, 3, 5, 7, 9 at a 30 frame per second rate, reduced from the 60 frame per second rate, and the additional digital information of one bit per deleted frame as side information so as to indicate the selected nearest neighbor.

Figure 1B:
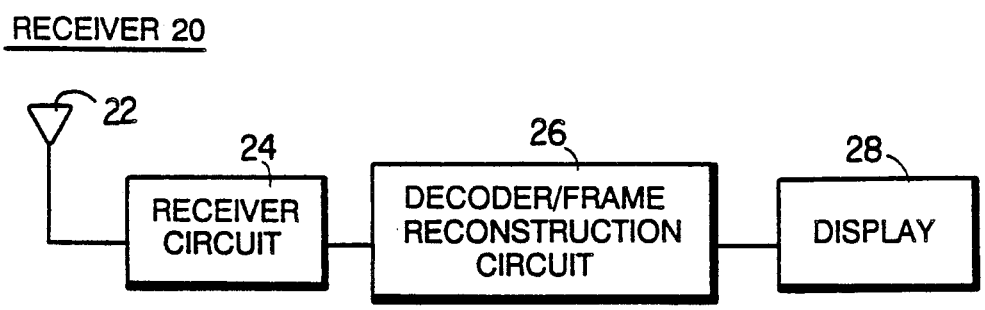

Referring now to FIGS. 1(b) and 2(b), it will be seen that at receiver 20 the signal is received by the receiver circuit 24 and is decoded by the decoder/frame reconstruction circuit 26. The decoder/frame reconstruction circuit 26 also converts the 30 frame per second video information for presentation at display 28 at a 60 frame per second rate. More particularly, the transmitted frames 1, 3, 5, 7, 9 are received and decoded at a 30 frame per second rate. The digital neighbor information (L, R, L, L) is also obtained from the transmitted signal. Now the reconstructed video may be generated for presentation at the display at a 60 frame per second rate (based upon the digital neighbor information). This reconstructed video includes the consecutive frames 1, 1, 3, 5, 5, 5, 7, 7, 9 as a representation of video frame material 1, 2, 3, 4, 5, 6, 7, 8, 9.

While the displayed reconstructed video may not be an entirely accurate representation of the source video material presented to the transmitter, it is a substantial representation of the source video material, and it has been broadcast at a substantially lower rate.

The present invention is particularly useful in the transmission of video frame material derived from film source. Conventional moving picture films are a common source of program material. For viewing these films in theatres, 24 film frames are shown in one second. It is therefore necessary to convert 24 frames per second film to a video source rate of 60 frames per second, such as by the known 3:2 pull-down method. In this method, one film frame is converted to two video frames by using the film frame twice and the next (second) film frame is converted to three video frames by using it three times. The next (third) film frame is converted to two video frames, and the next (fourth) film frame is converted to three video frames. The process continues in this manner, creating 12 sets of 5 video frames for every set of 24 film frames, thus converting the film into the 60 frames per second rate.

FIG. 3 is an example of video source material at a 60 frame per second rate which has been derived from a film source and is converted to 30 frame per second rate accompanied by digital neighbor information according to the present invention. More particularly, as shown in FIG. 3(a), at the transmitter, 60 frame per second video frames 1, 2, 3, 4, 5, 6, 7, 8, 9 are related to film frames F1, F1, F2, F2, F2, F3, F3, F4, F4, respectively. Now the odd video frames which are selected for transmission will correspond to film frames F1, F2, F2, F3, F4. In this example, the deleted frames are shown to be related to the nearest neighbors by the nearest neighbor digital information L, L, R, R, respectively, in the manner earlier described. (It will be observed that film frame F3, is indicated to have been received in video frame number 7. It is nevertheless being displayed in video frame number 6. Clearly, this is possible in a system which has adequate storage capability for receipt, processing and storage of the received transmission material, which is consistent with practice of the present invention.)

Now this information (30 frames per second and the digital nearest neighbor information) is transmitted to the receiver. As shown in FIG. 3(b) the reconstructed received video frame material is from frames 1, 3, 5, 7, and 9. This material corresponds to film frames F1, F2, F2, F3, F4, respectively, and is accompanied by digital neighbor information L, L, R, R, the latter representing deleted video frames 2, 4, 6, and 8, respectively.

Now the displayed video is reconstructed as follows: In video frame number 1, the received film frame F1 is displayed. In video frame number 2, according to the digital neighbor information bit, the left hand frame is repeated which in this case repeats film frame F1. In video frame number 3, film frame F2 is received and displayed. In video frame number 4, the digital neighbor information bit dictates a repeat of film frame F2. In video frame number 5, received film frame F2 is displayed. In video frame number 6, the neighbor information dictates that film frame F3 be displayed. In video frame number 7, the received film frame F3 is displayed. In video frame number 8, according to the digital neighbor information, film frame F4 is displayed, and in film frame number 9 the received film frame F4 is displayed. Now the video signal transmitted at a 30 frames per second rate has been converted to a 60 frames per second display rate. It is noted that the film frames displayed originated from the same film frames used for transmission.

In order to make a determination as to whether to represent a deleted frame with any particular neighboring frame or frames according to the transmitted digital neighboring information, some comparison between the frame being deleted and its neighbors must be made. The digital bit information indicates the neighbor to which the deleted frame is closer. Preferably, closeness to the neighbor is determined based upon comparing the energy of the difference of two frames. Hence, the frame to be deleted is first compared to the left frame (for example) and the energy of the error between the two frames is noted. Now the frame to be deleted and the right frame are compared and the energy of the error between the two frames is noted. These error energies are now compared. A selection is now made of the nearest neighbor frame which is closest to the frame being deleted and the neighbor information bit indicates this determination by indicating the left or right nearest neighbor.

In the process of deciding neighborhood information, it may be preferable to give a biased preference to particular neighbor selection criteria. For example, either the left or right nearest neighbor can be given special preference. Therefore, where preference is given to for example the left, the left neighbor is always chosen except when the right is very much similar to the deleted frame under consideration. This will result in smoother motion at the display, since a continuous variation between left and right neighbors can create some appearance of jerky motion in a scene having motion. Therefore, the preferred neighbor, whether left or right, is always selected by the system unless the other neighbor is very much closer in content to the frame being deleted. This preference reduces the jerkiness artifact.

The term very much closer may be defined according to engineering tradeoffs between reduction of jerky motion and accuracy in representation of a deleted frame. In a preferred embodiment, a left (or right) neighbor is selected always unless the error difference attributed to the left (or right) neighbor is greater by a preset percentage than the error difference associated with the right (or left) neighbor.

The comparison between frames may be done on a pixel-by-pixel basis, where energy differences are noted and then all differences are summed per frame to enable a frame-to-frame comparison. In a preferred embodiment of the invention, the error energy is obtained by a simple mean squared error method. In such a method, the difference between the two compared signals is squared and summed over the number of picture elements in the compared video frames. This results in a mean squared error between the two compared signals. This process is performed to obtain the left and right error energies. The error energies are then compared as discussed above.

A preferred embodiment of the invention is shown in the block diagram of FIG. 4. In FIG. 4(a), at transmitter 10, frame reduction/coder circuit 14 is shown having a frame selector circuit 30 that receives the 60 frames per second video source material and selects every other frame. The frames selected are coded (represented efficiently) by a coder circuit 34 (such as via transform or subband analysis). The comparison processing circuit 32 receives the selected frames and the frames to be discarded, and for each frame to be deleted performs the error energy comparison of neighbors and determines the nearest neighbor that will represent the frame to be deleted. A frame output 36 from coder circuit 34 of the frame reduction/coder circuit 14 represents the coded odd (or even) number video frames to be transmitted. A second output 38 from the comparison processing circuit 32 of frame reduction/coder circuit 14 is the digital nearest neighbor information signal also to be transmitted. These outputs are applied to the processor/transmitter unit as described earlier.

Figure 4B:
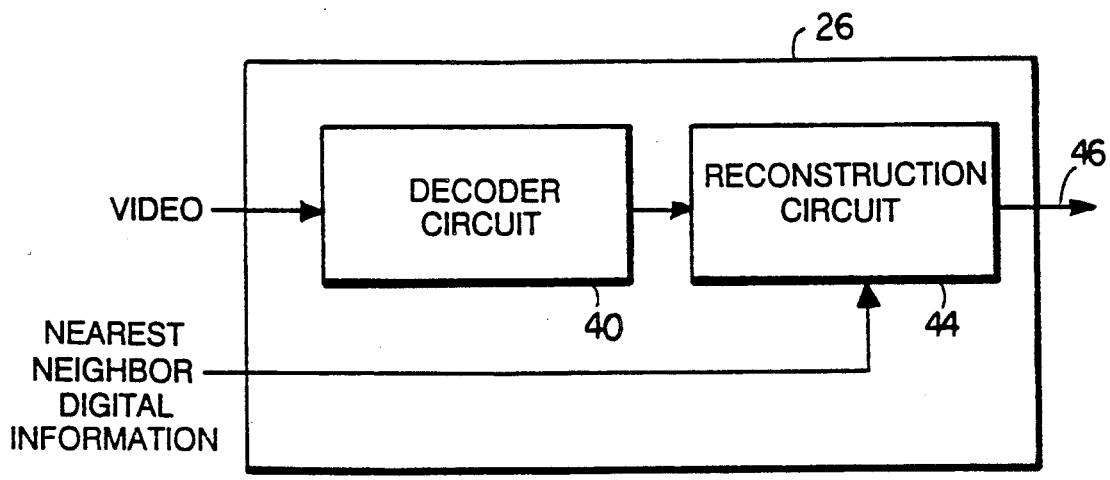

In FIG. 4(b), at receiver 20, the received video frames are decoded by decoder circuit 40 of decoder/frame reconstruction circuit 26. The reconstruction circuit 44 receives the decoded video frames. The digital information signal is obtained in receiver circuit 24 and is likewise applied to the reconstruction circuit 44. The reconstruction circuit 44 now reconstructs the 60 frames per second video rate material by reconstructing the deleted video frames from the decoded video frames according to the digital bit information.

Other embodiments are within the following claims.

What is claimed is:

1. A method of reducing the information required to represent a multiplicity of sequential frames of video source material having a frame rate of N frames per second, comprising the steps of
    selecting a subset of the multiplicity of frames,
    selecting a given frame not in the subset and for the given frame making a determination of which frames of the subset are its respective leading and trailing neighbors and which of these neighbors should be used to represent the given frame, and
    representing this determination with selection information, whereby a representation of a portion of the video source material may be generated with the selection information and the subset.

2. The method of claim 1 wherein the representing comprises transmitting the subset of frames and selection information over a communication channel.

3. The method of claim 1 wherein every other frame is in the subset so that the multiplicity of frames is processed at a rate of N/2 frames per second.

4. The method of claim 1 wherein the step of determining which neighbors should be used to represent a given frame includes determining the differences between the frame not in the subset and the neighbors and selecting the neighbor that satisfies a criterion.

5. The method of claim 4 wherein the nearest neighbor trailing the frame not in the subset is selected unless the difference attributed to the trailing neighbor is greater by a preset percentage than the difference attributed to the other neighbor.

6. The method of claim 4 wherein the nearest neighbor leading the frame not in the subset is selected unless the difference attributed to the leading neighbor is greater by a preset percentage than the difference attributed to the other neighbor.

7. The method of claim 4 wherein the differences are energy differences.

8. A method of reducing broadcast information by representing video source material having a frame rate of N frames per second with video source material having a frame rate of M frames per second, where $N > M$, comprising the steps of
    capturing a segment of the N frames per second video source material having a first, middle and third consecutive frame,
    determining the content difference between the first and middle and the middle and third frames,
    selecting either the first or third frame to represent the middle frame and representing this selection with selection information, and
    maintaining as broadcast material the first and third video frame and the selection information, whereby a representation of the captured segment of the video material can be generated from the broadcast material.

9. The method of claim 8 wherein maintaining as broadcast material includes transmitting the broadcast material over a communication channel.

10. The method of claim 8 wherein the content differences are energy differences.

11. The method of claim 10 wherein $M = N/2$.

12. The method of claim 11 wherein $N = 60$ and $M = 30$.

13. The method of claim 8 wherein determining the content difference comprises the step of determining the differences between the middle frame and the first and third frames.

14. The method of claim 13 wherein the third frame is selected unless the difference attributed to the third frame is greater by a preset percentage than the difference attributed to the first frame.

15. The method of claim 13 wherein the first frame is selected unless the difference attributed to the first frame is greater by a preset percentage than the difference attributed to the third frame.

16. An apparatus for reducing the information required to represent a multiplicity of sequential frames of video source material having a frame rate of N frames per second, comprising
    a circuit for selecting a subset of the multiplicity of frames,
    a circuit for selecting a given frame not in the subset and for the given frame making a determination which frames of the subset are its respective leading and trailing neighbors and which of these neighbors should be used to represent the given frame, and a circuit for representing this determination with selection information, whereby a representation of a portion of the video source material may be generated with the selection information and the subset.

17. The apparatus of claim 16 wherein the circuit for representing comprises a circuit for transmitting the subset of frames and selection information over a communication channel.

18. The apparatus of claim 16 wherein every other frame is in the subset so that the multiplicity of frames is processed at a rate of N/2 frames per second.

* * * * *